US012798654B2

(12) United States Patent
Xu

(10) Patent No.: US 12,798,654 B2
(45) Date of Patent: Nov. 17, 2026

(54) BABY STROLLER WITH FUNCTIONS OF CAMPER

(71) Applicant: Dongguan Master Kids Products Co., Ltd., Dongguan (CN)

(72) Inventor: Jiahong Xu, Dongguan (CN)

(73) Assignee: Dongguan Master Kids Products Co., Ltd., Dongguan (CN)

( * ) Notice: Subject to any disclaimer, the term of this patent is extended or adjusted under 35 U.S.C. 154(b) by 170 days.

(21) Appl. No.: 18/950,309

(22) Filed: Nov. 18, 2024

(65) Prior Publication Data

US 2025/0346277 A1 Nov. 13, 2025

(30) Foreign Application Priority Data

May 7, 2024 (CN) ........................ 202420975091.X

(51) Int. Cl.

| | |
|---|---|
| ***B62B 7/14*** | (2006.01) |
| ***B62B 7/00*** | (2006.01) |
| ***B62B 7/06*** | (2006.01) |
| ***B62B 9/14*** | (2006.01) |
| ***B62B 9/26*** | (2006.01) |

(52) U.S. Cl.

CPC .............. *B62B 7/142* (2013.01); *B62B 7/008* (2013.01); *B62B 7/062* (2013.01); *B62B 9/14* (2013.01); *B62B 9/26* (2013.01); *B62B 2205/20* (2013.01)

(58) Field of Classification Search

CPC ......... B62B 7/008; B62B 7/062; B62B 7/142; B62B 7/123; B62B 9/14

See application file for complete search history.

(56) References Cited

U.S. PATENT DOCUMENTS 4,391,453 A * 7/1983 Glaser ...................... B62B 7/123 280/47.4
4,597,116 A * 7/1986 Kassai .................... B62B 7/123 5/99.1
4,836,573 A * 6/1989 Gebhard ................... B62B 9/26 280/47.38
5,074,575 A * 12/1991 Bigo ......................... B62B 7/10 280/647
5,115,523 A * 5/1992 Cone .................... B60N 2/2857 297/256.13
5,201,535 A * 4/1993 Kato ....................... B62B 7/123 297/229

(Continued)

*Primary Examiner* — Jeffrey J Restifo
(74) *Attorney, Agent, or Firm* — JEEN IP LAW, LLC

(57) ABSTRACT

The present invention discloses a baby stroller with the functions of camper and, based on the camping rack assembly, support assembly, disassembly and assembly structure, folding assembly, and retraction assembly, the camping rack assembly and support assembly cooperate to install the camping rack assembly on the vehicle frame, forming a baby stroller with functions of camper and, during the folding and unlocking process, after pressing the retraction button and pulling the retraction button upwards to unlock relevant components, the handle tube can be pressed downward to move towards the position where the back supports are close to each other, while driving the front support to fold downwards, and during this process, the folding assembly can drive the support assembly, along with the camping rack assembly, to achieve the interlocking folding of the entire vehicle until it is fully folded together.

16 Claims, 10 Drawing Sheets

(56) References Cited

U.S. PATENT DOCUMENTS

| | | | | | |
|---|---|---|---|---|---|
| 5,375,869 | A * | 12/1994 | Hsiao | A47D 1/002 280/47.38 |
| 5,580,072 | A * | 12/1996 | Monneret | B62B 9/10 280/47.38 |
| 6,139,046 | A * | 10/2000 | Aalund | B62B 9/20 280/47.38 |
| 6,513,827 | B1 * | 2/2003 | Barenbrug | B62B 7/145 280/643 |
| 7,338,127 | B2 * | 3/2008 | Church | B62B 9/102 297/118 |
| 7,364,183 | B2 * | 4/2008 | Lee | B62B 7/142 280/47.38 |
| 7,681,894 | B2 * | 3/2010 | Santamaria | B62B 7/142 280/47.38 |
| 8,534,698 | B2 * | 9/2013 | Dotsey | B62B 7/08 280/647 |
| 8,657,326 | B2 * | 2/2014 | Shaanan | B62B 9/102 280/47.38 |
| 8,840,133 | B2 * | 9/2014 | Li | B62B 7/10 280/658 |
| 8,851,505 | B2 * | 10/2014 | Van Gelderen | B62B 7/142 280/658 |
| 8,882,134 | B2 * | 11/2014 | Rolicki | B62B 9/02 280/647 |
| 9,545,940 | B2 * | 1/2017 | Taylor | B62B 7/142 |
| 9,610,966 | B2 * | 4/2017 | Zhong | A47D 11/005 |
| 10,023,218 | B2 * | 7/2018 | Paxton | A47D 1/006 |
| 10,077,063 | B2 * | 9/2018 | Haut | B62B 7/10 |
| 10,106,185 | B2 * | 10/2018 | Plested | B62B 7/068 |
| 10,442,453 | B2 * | 10/2019 | Haut | B62B 7/062 |
| 10,449,987 | B2 * | 10/2019 | Gibson | B62B 9/28 |
| 10,899,377 | B2 * | 1/2021 | Eggert-Crowe | B62B 7/008 |
| 10,913,481 | B2 * | 2/2021 | Kim | B62B 7/06 |
| 11,001,289 | B2 * | 5/2021 | Gibson | B62B 7/008 |
| 11,052,933 | B2 * | 7/2021 | Cheng | B62B 7/10 |
| 11,059,510 | B2 * | 7/2021 | Eyman | B62B 7/08 |
| 11,097,761 | B2 * | 8/2021 | Kim | B62B 5/0043 |
| 11,292,500 | B2 * | 4/2022 | Fan | B62B 7/08 |
| 11,472,462 | B1 * | 10/2022 | Choi | B62B 7/105 |
| 11,673,596 | B2 * | 6/2023 | Li | B62B 7/142 280/658 |
| 11,685,419 | B2 * | 6/2023 | Yi | B62B 9/10 280/47.38 |
| 11,807,289 | B2 * | 11/2023 | Zhong | B62B 7/142 |
| 11,840,272 | B2 * | 12/2023 | Zhong | B62B 7/06 |
| 11,851,099 | B2 * | 12/2023 | Nieuwenhuizen | B62B 9/10 |
| 11,993,301 | B2 * | 5/2024 | Cheng | B62B 7/142 |
| 12,128,944 | B2 * | 10/2024 | Chen | B62B 7/064 |
| 12,178,187 | B2 * | 12/2024 | Jakubowski | A01K 1/0254 |
| 12,291,258 | B2 * | 5/2025 | Hartenstine | B62B 7/142 |
| 12,337,891 | B2 * | 6/2025 | Nieuwenhuizen | B62B 7/10 |
| 12,377,899 | B2 * | 8/2025 | Huang | B62B 7/008 |
| 12,545,313 | B2 * | 2/2026 | Huang | B62B 7/142 |
| 12,565,255 | B2 * | 3/2026 | Liu | B62B 3/007 |
| 12,630,209 | B2 * | 5/2026 | Zhong | B62B 9/08 |
| 2008/0231022 | A1 * | 9/2008 | Hu | B62B 7/145 280/643 |
| 2012/0169021 | A1 * | 7/2012 | Jane Santamaria | B62B 7/14 280/47.35 |
| 2015/0183450 | A1 * | 7/2015 | Chen | B62B 7/14 280/47.35 |
| 2018/0162437 | A1 * | 6/2018 | Mostert | B62B 9/102 |
| 2020/0247453 | A1 * | 8/2020 | Gibson | B62B 3/022 |
| 2023/0140571 | A1 * | 5/2023 | Lyn | B62B 9/14 280/650 |
| 2023/0365180 | A1 * | 11/2023 | Yuan | A47D 13/027 |
| 2023/0373548 | A1 * | 11/2023 | Yuan | B62B 7/08 |
| 2023/0397570 | A1 * | 12/2023 | Cheng | A01K 1/0245 |
| 2024/0326892 | A1 * | 10/2024 | Zehfuss | B62B 3/007 |
| 2025/0108850 | A1 * | 4/2025 | Walsh | B62B 7/062 |
| 2025/0145204 | A1 * | 5/2025 | Zhong | B62B 7/06 |
| 2025/0171067 | A1 * | 5/2025 | Chi | B60N 2/2845 |
| 2025/0346277 | A1 * | 11/2025 | Xu | B62B 9/14 |
| 2026/0000366 | A1 * | 1/2026 | Cheng | A61B 5/746 |
| 2026/0076489 | A1 * | 3/2026 | Wang | A47D 13/027 |
| 2026/0116453 | A1 * | 4/2026 | Crossgrove | B62B 3/04 |
| 2026/0131842 | A1 * | 5/2026 | Huang | A47D 13/027 |

* cited by examiner

BABY STROLLER WITH FUNCTIONS OF CAMPER

CROSS-REFERENCE TO RELATED APPLICATIONS

This application claims priority to Chinese Patent Application No. 202420975091.X, filed on May 7, 2024, which is hereby incorporated by reference in its entirety.

TECHNICAL FIELD

The present invention relates to the technical field of baby and child products, particularly to a baby stroller with functions of camper.

BACKGROUND

The existing baby strollers usually provide a single base in the vehicle frame or a sleeping basket installed in the vehicle body, and on the other hand, two seats or two sleeping baskets are installed side by side or in the front and back of the vehicle, and the are usually installed in the pivot seat in a fixed position, and their installation position is fixed and unchanged, the above technical solutions cannot be freely converted to install seats or sleeping baskets, nor can they be randomly installed in the front or rear support, or installed in both the front and rear support. In addition, existing baby strollers do not support the conversion into campers.

SUMMARY

The main purpose of the present invention is to propose a baby stroller with functions of camper, aiming to address the technical problem of single usage function baby strollers in the prior art.

To achieve the above purposes, the present invention proposes a baby stroller with functions of camper so that the baby stroller not only provides the function of seats or sleeping baskets, but also has the function of a camper, the baby stroller with functions of camper includes a camping frame assembly, and the camping frame assembly includes a surrounding frame, and the surrounding frame is provided with a front connecting base and a rear connecting base;

- a support assembly, the support assembly includes a front support foot, a rear support foot, a first support base disposed on the front support foot, and a second support base disposed on the rear support foot, the front connecting base is detachably connected to the first support base, and the rear connecting base is detachably connected to the second support base;
- a disassembly and assembly structure, through which the camping frame assembly can be detachably installed on the support assembly;
- a folding assembly, and the folding assembly is connected to the support assembly; and
- a retraction assembly, and the retraction assembly is used to control the folding assembly to retract the camper.

In further, the surrounding frame includes a first surrounding frame and a second surrounding frame, and the first surrounding frame and the second surrounding frame are directly or indirectly pivotably connected through a middleware.

In further, the middleware is a surrounding frame joint, including a front surrounding frame joint and a rear surrounding frame joint, and the front surrounding frame joint and the rear surrounding frame joint can be pivotally connected.

In further, the camping frame assembly further includes a storage tray, and the two ends of the storage tray are respectively connected to the surrounding frame joint.

In further, the camping frame assembly further includes at least one ceiling assembly, the ceiling assembly includes a mounting base and a frame connecting the mounting base, the mounting base includes a connecting base and a pivot base, the free end of the frame is inserted into the connecting base, the connecting base is pivotally connected to the pivot base, and the pivot base is installed on the surrounding frame or surrounding frame joint.

In further, two ceiling assemblies are provided, and they are disposed opposite each other.

In further, the upper end of the front connecting base can be pivotally connected to the first surrounding frame, the lower end of the front connecting base can be pivotally connected to the first support base, the upper end of the rear connecting base can be pivotally connected to the first surrounding frame, and the lower end of the rear connecting base can be pivotally connected to the second support base.

In further, the front connecting base includes a first upper section and a first lower section, the upper end of the first upper section can be pivotally connected to the first surrounding frame, the lower end of the first upper section can be pivotally connected to the upper end of the first lower section, and the lower end of the first lower section can be detachably connected to the upper end of the first support base.

In further, the rear connecting base includes a second upper section and a second lower section, the upper end of the second upper section can be pivotally connected to the second surrounding frame, the lower end of the second upper section can be pivotally connected to the upper end of the second lower section, and the lower end of the second lower section can be detachably connected to the upper end of the second support base.

In further, the folding assembly includes:

- a handle tube joint;
- a front support joint that is disposed on the front support foot, and the handle tube joint and front support joint are rotatably disposed with each other;
- a rear support joint that is disposed on the rear support foot;
- a joint clasp that is disposed at the rear support joint, the joint clasp is used to lock and release the handle tube joint from the front support joint.

In further, the handle tube joint is provided with a first arc-shaped groove, the front support joint is provided with a second arc-shaped groove, and both the first and second arc-shaped grooves are provided with locking grooves.

In further, the retraction assembly includes a retraction button, a linkage piece, a joint clasp, and a clasp mounting base, the linkage piece includes a retraction steel rope, the first end of the retraction steel rope is connected to the retraction button, and the second end of the retraction steel rope is connected to the clasp mounting base.

In further, the disassembly and assembly structure includes:

- an unlock button;
- a locking hook, and the locking hook is disposed on the unlock button;
- a first locking hole, and the first locking hole fits with the locking hook for locking and unlocking purpose;

a plug, and the plug is disposed on the first support base and the second support base, and the first locking hole is disposed on the plug;

a socket, and the socket is disposed on the front connecting base and rear connecting base, and the front connecting base and rear connecting base are detachably connected to the first support base and second support base through plugs and sockets.

In further, the baby stroller further includes a handle tube assembly, and the handle tube assembly includes:

an upper pipe section;

a lower pipe section, and the upper pipe section can be flexibly disposed on the lower pipe section to adjust the height of upper pipe section.

In further, the camping frame assembly further includes at least one seat structure, the seat structure is mounted on the surrounding frame, and the seat structure is provided with a seat portion and a foot portion.

In further, two seat structures are provided, and they are arranged in opposite directions.

In the technical solution of the present invention, based on the camping rack assembly, support assembly, disassembly and assembly structure, folding assembly, and retraction assembly, the camping rack assembly and support assembly cooperate to install the camping rack assembly on the vehicle frame, forming a baby stroller with functions of camper and, during the folding and unlocking process, after pressing the retraction button and pulling the retraction button upwards to unlock relevant components, the handle tube can be pressed downward to move towards the position where the back supports are close to each other, while driving the front support to fold downwards, and during this process, the folding assembly can drive the support assembly, along with the camping rack assembly, to achieve the interlocking folding of the entire vehicle until it is fully folded together and, during unfolding, it is only needed to lift the handle tube so that the front support assembly and camping rack assembly can be locked in place simultaneously, and the baby stroller features simple and convenient operation, reasonable folding structure, ideal stability, as well as safe and reliable use.

Figure 1:
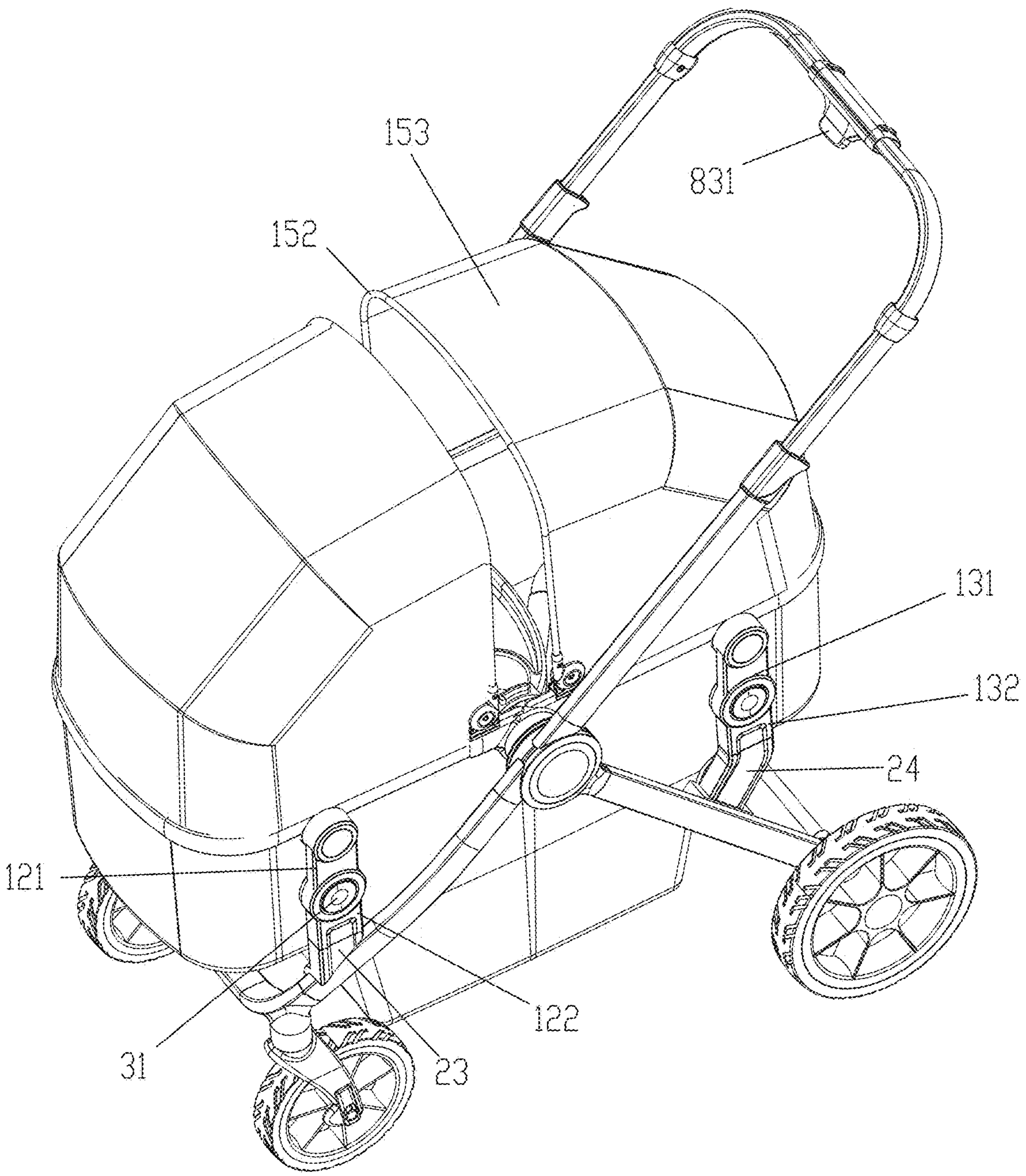
FIG. 1 is a 3D view of the present invention.

The above-mentioned diagrams of camping frame assembly include the following attached markings:

Camping frame assembly; 111. First surrounding frame; 112. Second surrounding frame; 113*a*. Front surrounding frame joint; 113*b*, Rear surrounding frame joint; 12. Front connecting base; 121. First upper section; 122. First lower section; 13. Rear connecting base; 131. Second upper section; 132. Second lower section; 151. Mounting base; 1511. Connecting base; 1512. Pivot base; 152. Frame; 153. Ceiling; 16. Base structure; 161. Seat portion; 162. Foot portion; 21. Front support feet; 22. Rear support feet; 23. First support base; 24. Second support base; 31. Unlock button; 32. locking hook; 33. First locking hole; 41. Handle tube joint; 411. First arc-shaped groove; 42. Front support joint; 421. Second arc-shaped groove; 43. Rear support joint; 44. Joint clasp; 46. Lock slot; 51. Retraction button; 521. Retraction steel rope; 6. Storage tray; 81. Upper pipe section; 82. Lower pipe section; 100. Sleeping basket assembly; 200. Seat assembly.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

The present invention provides a baby stroller with functions of camper, as shown in FIGS. 1 to 10, including a camping frame assembly 1, a support assembly, a disassembly and assembly structure, a folding assembly 4, and a retraction assembly 5, the camping frame assembly 1 includes a surrounding frame, and the surrounding frame is provided with a front connecting base 12 and a rear connecting base 13;

a support assembly, the support assembly includes a front support foot 21, a rear support foot 22, a first support base 23 disposed on the front support foot 21, and a second support base 24 disposed on the rear support foot 22, the front connecting base 12 is detachably connected to the first support base 23, and the rear connecting base 13 is detachably connected to the second support base 24;

- a disassembly and assembly structure, through which the camping frame assembly 1 can be detachably installed on the support assembly;
- a folding assembly 4, and the folding assembly 4 is connected to the support assembly; and
- a retraction assembly 5, and the retraction assembly 5 is used to control the folding assembly 4 to retract the camper.

Figure 2:
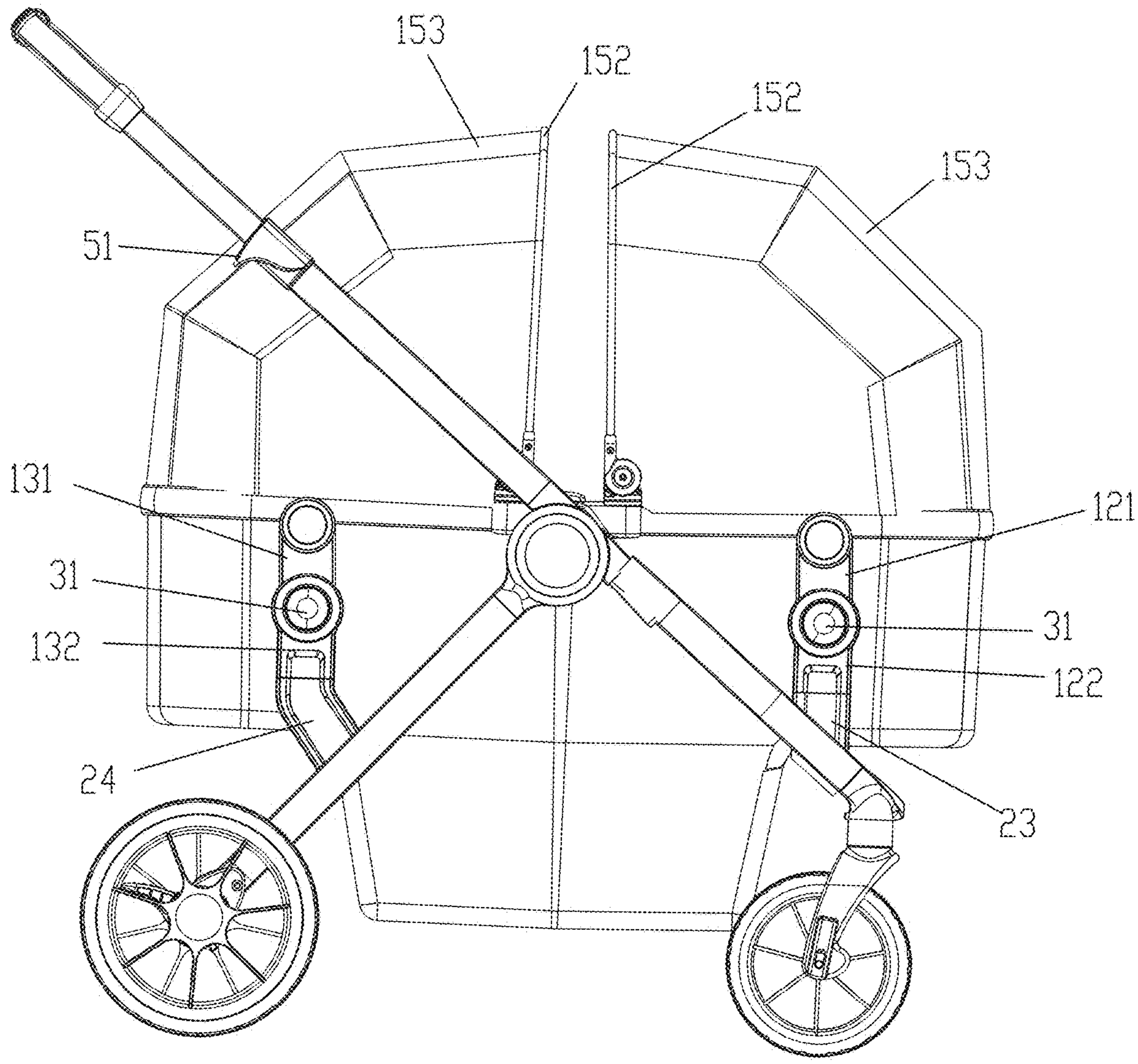
FIG. 2 is a front view of the present invention.
Figure 3:
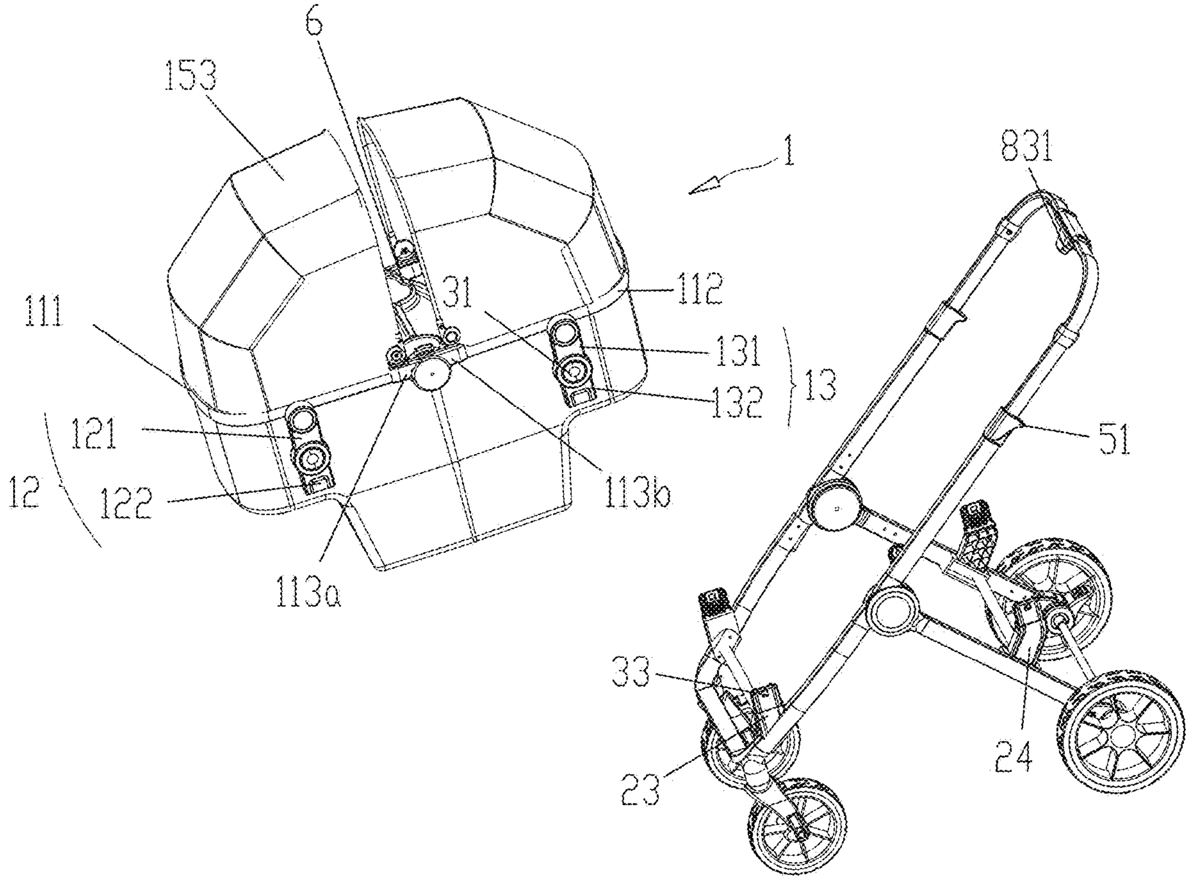
FIG. 3 is a diagram of camping frame assembly and the vehicle frame in detached state of the present invention.
Figure 4:
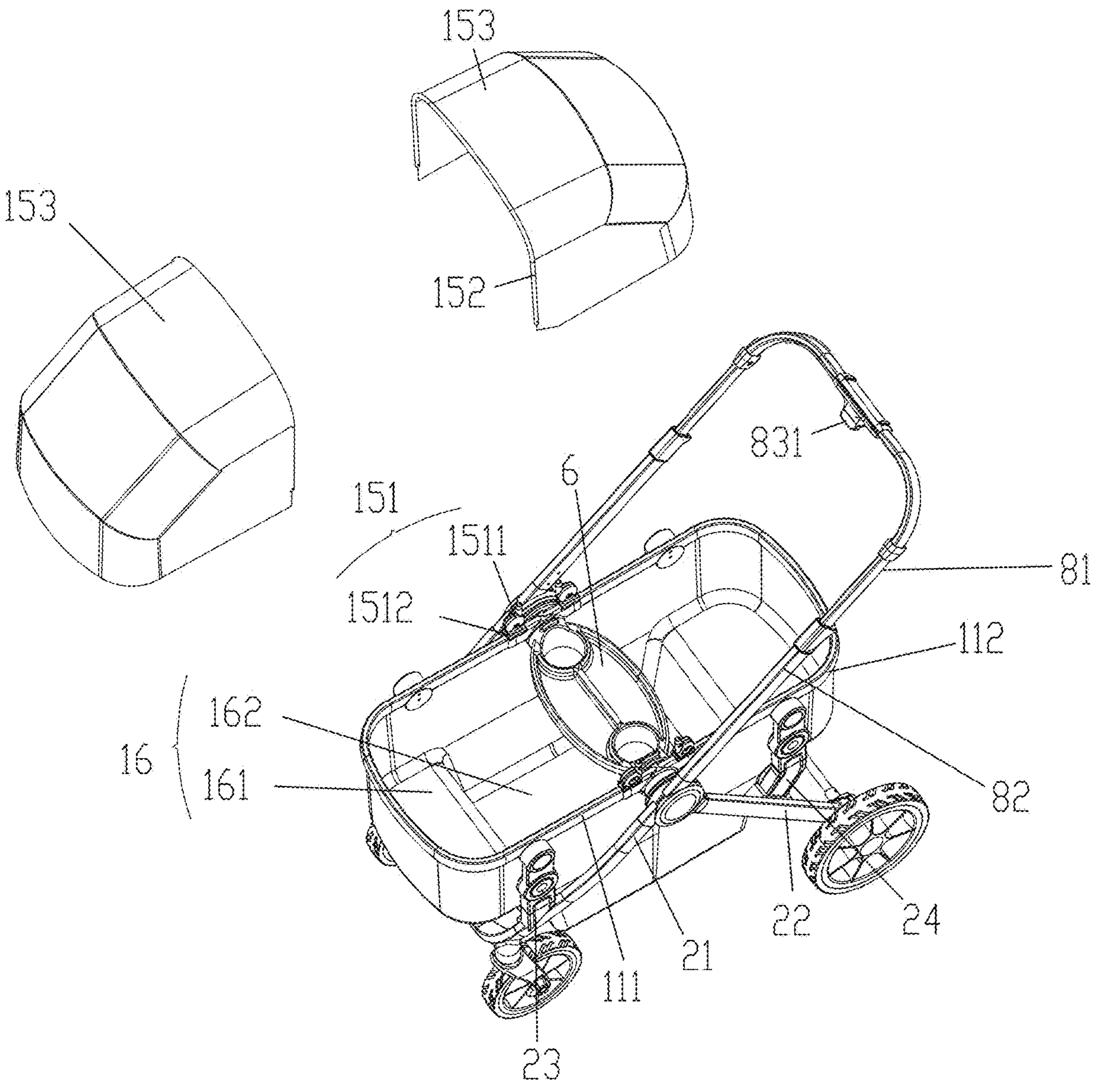
FIG. 4 is a diagram of the ceiling in detached state of the present invention.
Figure 5:
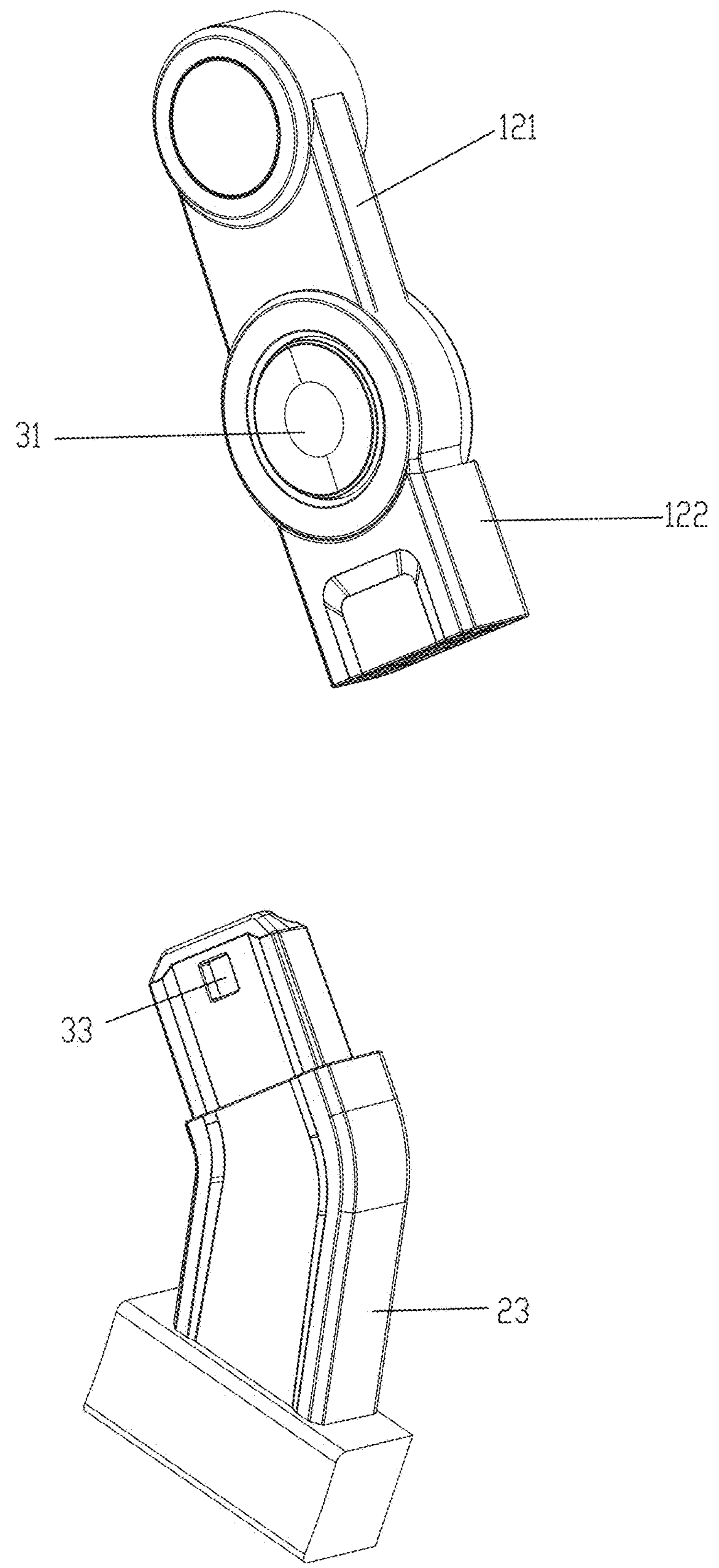
FIG. 5 is a 3D view of the first upper section, first lower section, and first support base of the present invention.
Figure 6:
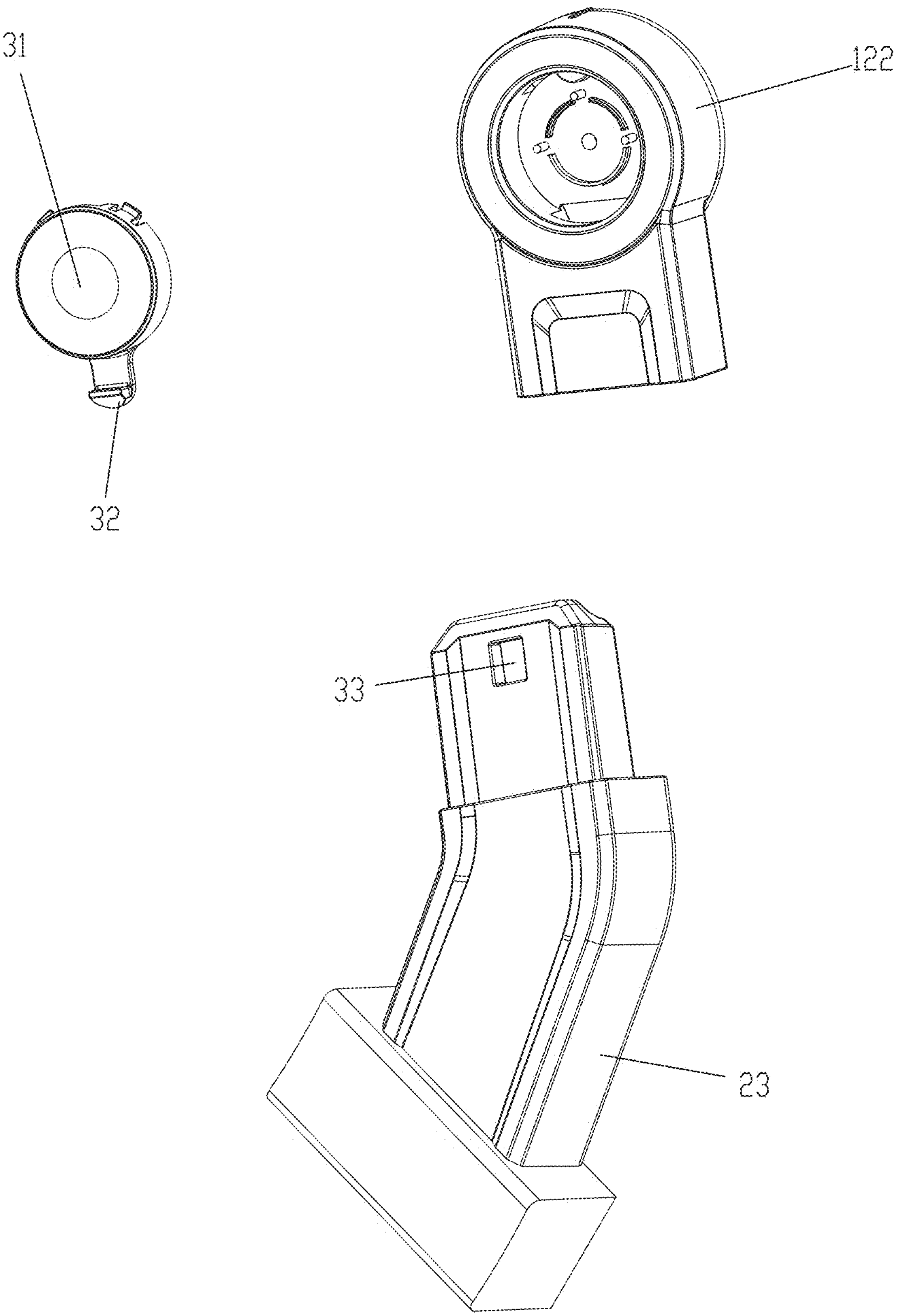
FIG. 6 is a 3D view of the first lower section and the first support base of the present invention.
Figure 7:
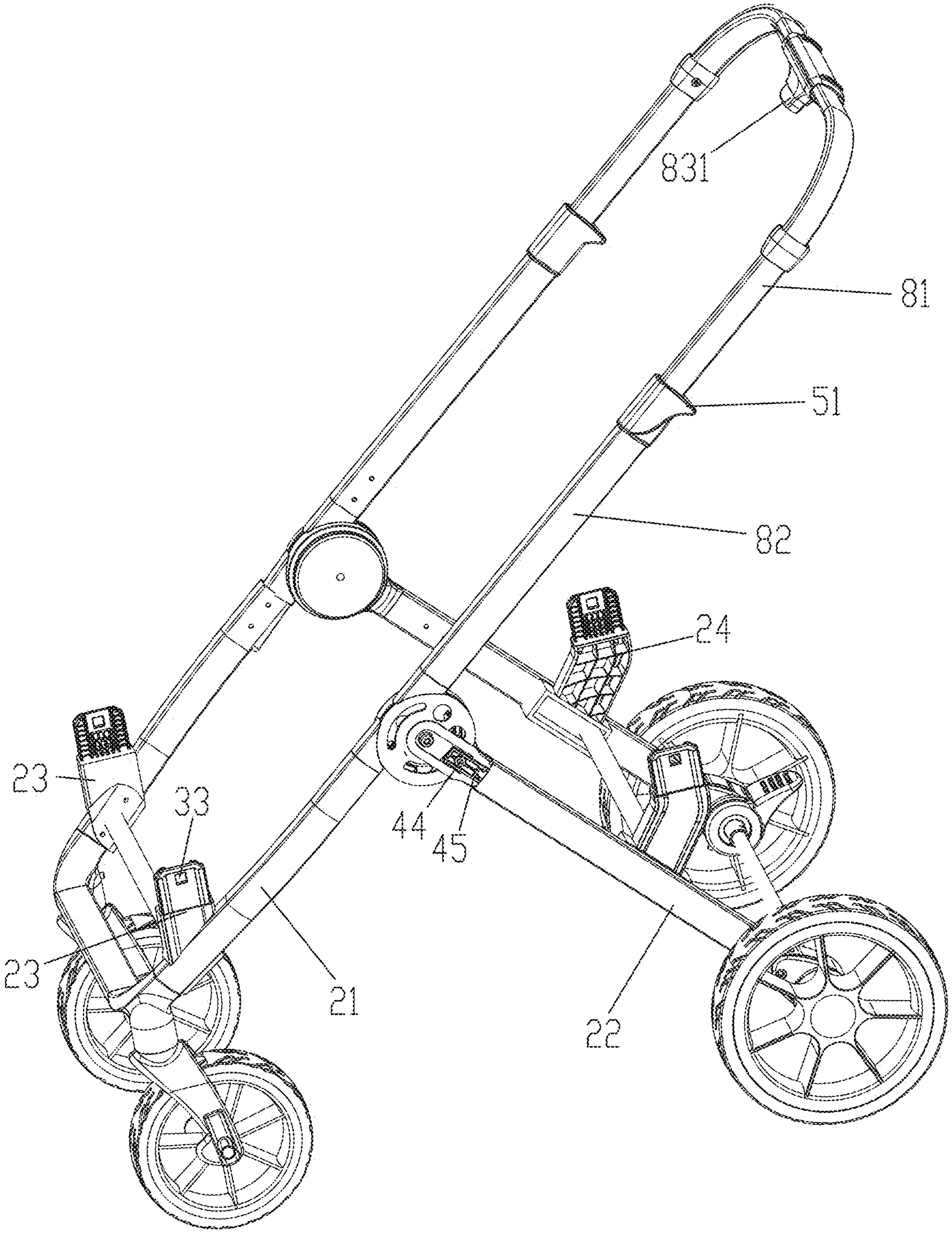
FIG. 7 is a 3D view of the chassis of the present invention.
Figure 8:
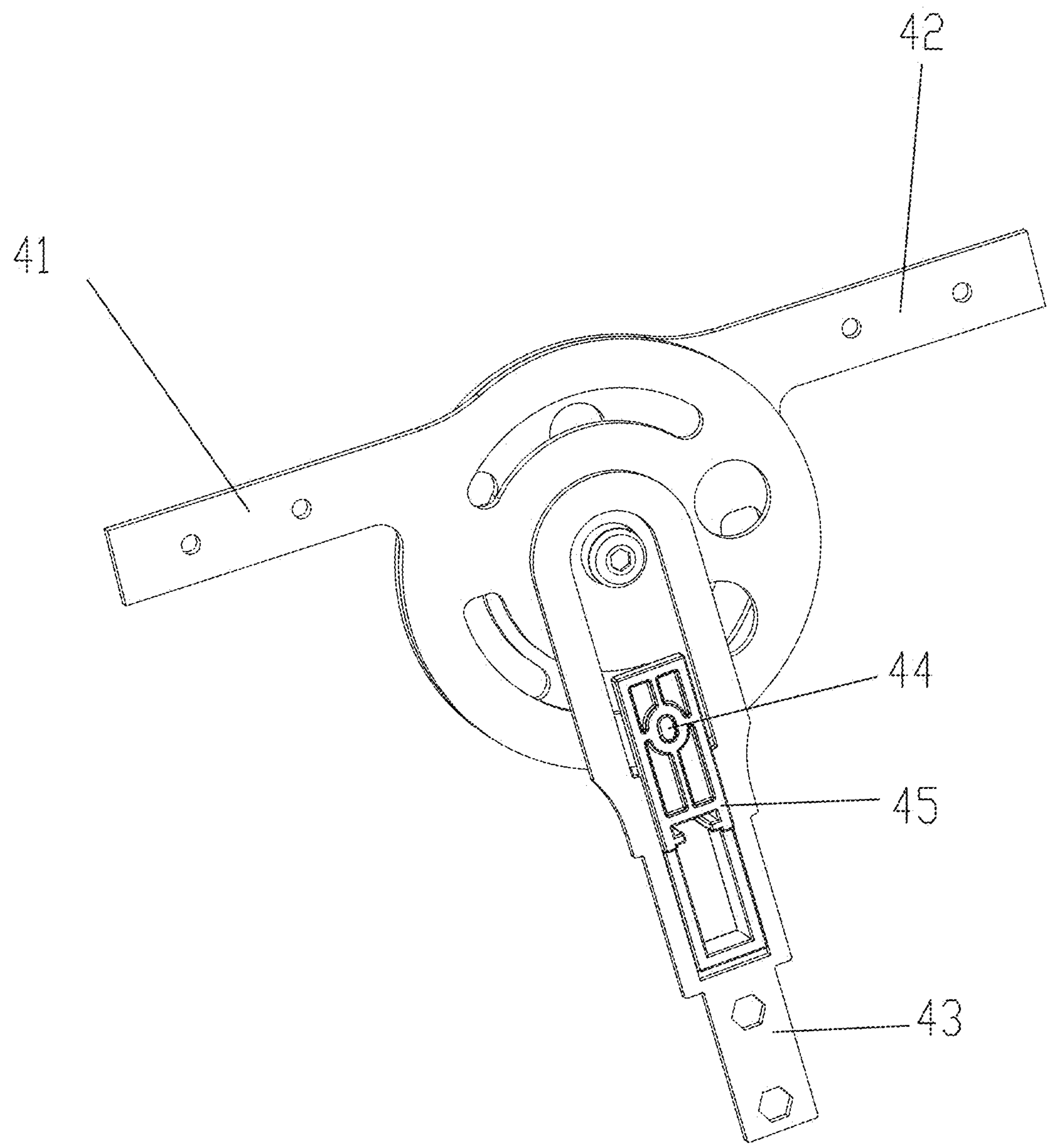
FIG. 8 is a 3D view of the folding assembly of the present invention.
Figure 9:
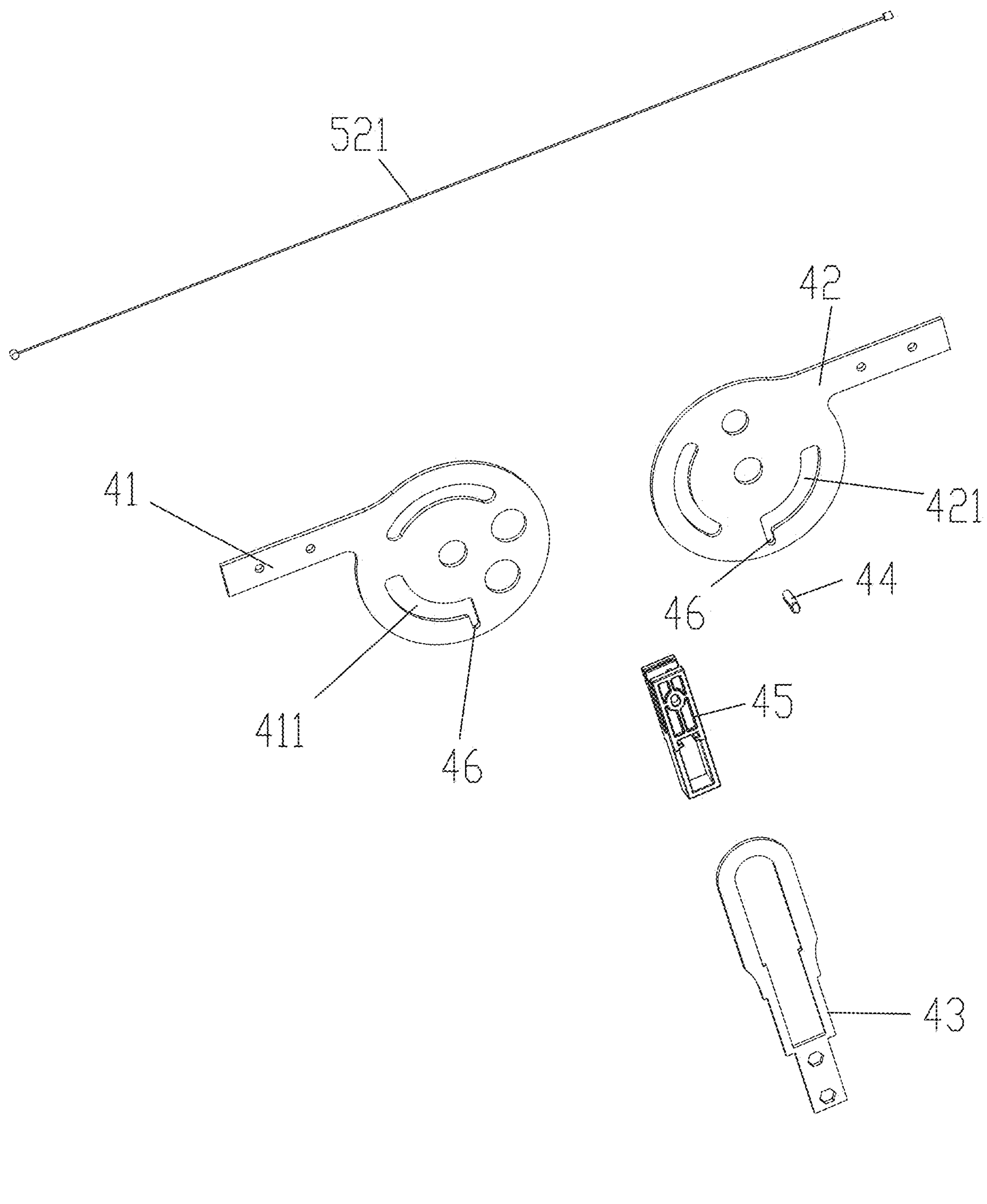
FIG. 9 is an exploded view of the folding assembly of the present invention.
Figure 10:
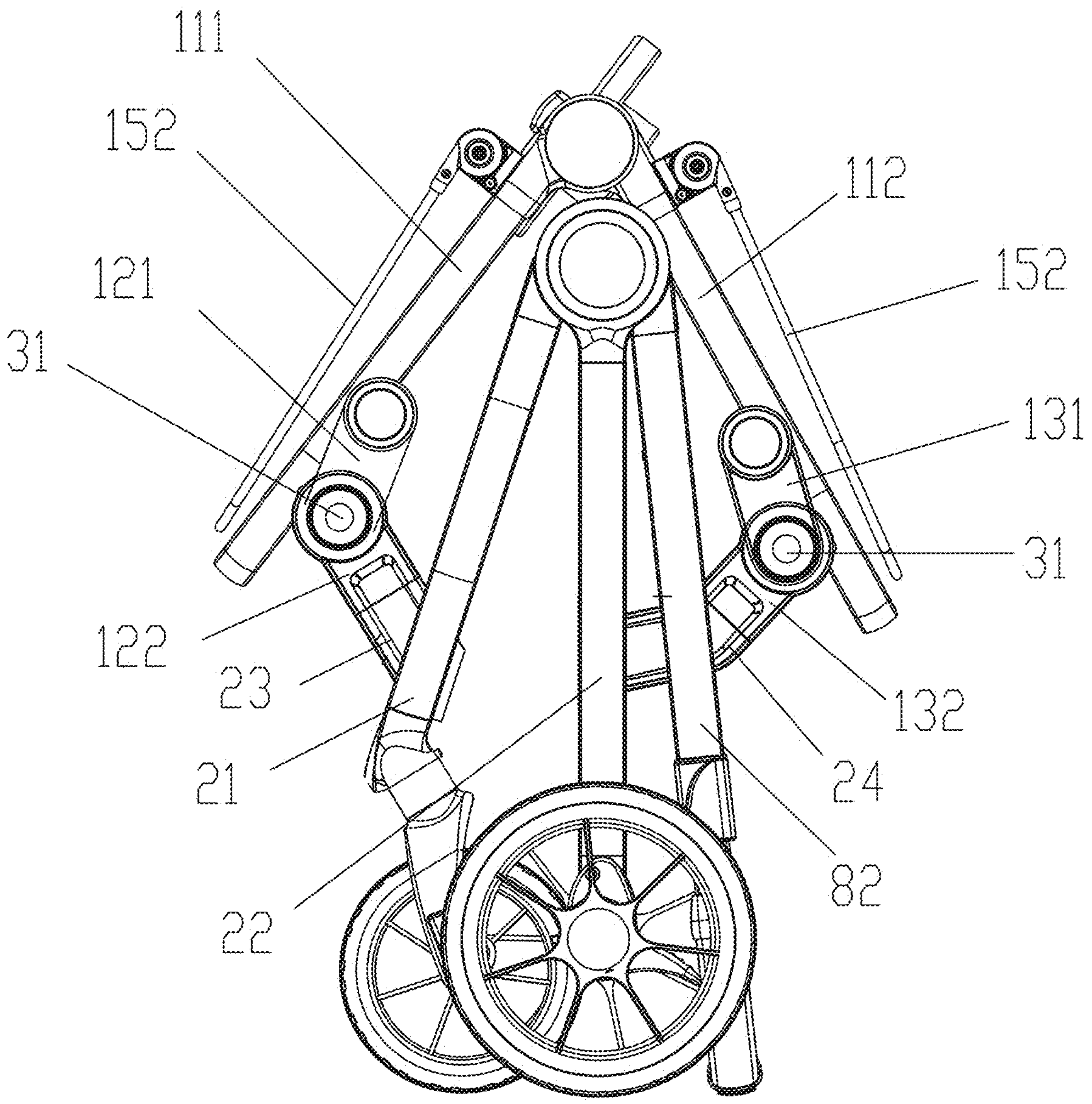
FIG. 10 is a folding state diagram of the present invention.

As shown in FIGS. 1 and 2, it should be noted that the present invention can implement a plurality of usage functions. The first function is to install the camping frame assembly 1 on the first support base 23 and the second support base 24 for use, that is, to install the camping frame assembly 1 on the support assembly to realize the functions of camper;

The second function (not illustrated) is to install a separate sleeping basket in the first support base 23 and a separate seat in the second support base 24;

The third function (not illustrated) is to install a separate sleeping basket in the first support base 23 and a separate seat in the second support base 24;

The fourth function (not illustrated) is to install a separate sleeping basket in the first support base 23 and a separate sleeping basket in the second support base 24, that is, to install two sleeping baskets simultaneously;

The fifth function (not illustrated) is to install a separate seat in the first support base 23 and a separate seat in the second support base 24, that is, to install two seats simultaneously.

The above replacement means can all be achieved through a matching disassembly and assembly structure.

Understandably, the present invention can install one of the three assemblies, camping frame assembly 1, sleeping basket assembly 100, and seat assembly 200, on the vehicle frame for different purposes and different usage functions, or combine sleeping basket assembly 100 and seat assembly 200 on the frame, or install two sleeping basket assemblies 100 on the frame at the same time, or both seat assemblies 200 on the frame at the same time. The present invention can, according to actual needs, selectively install camping frame assembly 1, sleeping basket assembly 100, or seat assembly 200 into the stroller for the purpose of multifunctional use.

In the embodiment of the present invention, the surrounding frame includes a first surrounding frame 111 and a second surrounding frame 112, and the first surrounding frame 111 and the second surrounding frame 112 are directly or indirectly pivotably connected through a middleware.

In the embodiment of the present invention, the middleware is a surrounding frame joint, including a front surrounding frame joint 113*a* and a rear surrounding frame joint 113*b*, and the front surrounding frame joint 113*a* and the rear surrounding frame joint 113*b* can be pivotally connected.

In the embodiment of the present invention, the camping frame assembly 1 further includes a storage tray 6, and the two ends of the storage tray 6 are respectively connected to the surrounding frame joint, and the storage tray can hold containers, bottles, snacks, and other food or items.

In the embodiment of the present invention, the camping frame assembly 1 further includes at least one ceiling assembly, the ceiling assembly includes a mounting base 151, a ceiling 153 and a frame 152 connecting the mounting base 151, the mounting base 151 includes a connecting base 1511 and a pivot base 1512, the free end of the frame 152 is inserted into the connecting base 1511, the connecting base 1511 is pivotally connected to the pivot base 1512, and the pivot base 1512 is installed on the surrounding frame or surrounding frame joint.

In the embodiment of the present invention, two ceiling assemblies are provided, and they are disposed opposite each other.

In the embodiment of the present invention, the upper end of the front connecting base 12 can be pivotally connected to the first surrounding frame 111, the lower end of the front connecting base 12 can be pivotally connected to the first support base 23, the upper end of the rear connecting base 13 can be pivotally connected to the first surrounding frame 111, and the lower end of the rear connecting base 13 can be pivotally connected to the second support base 24.

In the embodiment of the present invention, the front connecting base 12 includes a first upper section 121 and a first lower section 122, the upper end of the first upper section 121 can be pivotally connected to the first surrounding frame 111, the lower end of the first upper section 121 can be pivotally connected to the upper end of the first lower section 122, and the lower end of the first lower section 122 can be detachably connected to the upper end of the first support base 23.

In the embodiment of the present invention, the rear connecting base 13 includes a second upper section 131 and a second lower section 13, the upper end of the second upper section 131 can be pivotally connected to the second surrounding frame 112, the lower end of the second upper section 131 can be pivotally connected to the upper end of the second lower section 132, and the lower end of the second lower section 132 can be detachably connected to the upper end of the second support base 24.

In the embodiment of the present invention, the folding assembly 4 includes:

- a handle tube joint 41;
- a front support joint 42 that is disposed on the front support foot 21, and the handle tube joint 41 and front support joint 42 are rotatably disposed with each other;
- a rear support joint 43 that is disposed on the rear support foot 22;
- a joint clasp 44 that is disposed at the rear support joint, the joint clasp 44 is used to lock and release the handle tube joint 41 from the front support joint 42.

In the embodiment of the present invention, the handle tube joint 41 is provided with a first arc-shaped groove 411, the front support joint 42 is provided with a second arc-shaped groove 421, and both the first and second arc-shaped grooves 411 & 421 are provided with locking grooves 46.

In the embodiment of the present invention, the retraction assembly includes a retraction button 51, a linkage piece, a joint clasp 44, and a clasp mounting base 45, the linkage piece includes a retraction steel rope 521, the first end of the retraction steel rope 521 is connected to the retraction button 51, and the second end of the retraction steel rope 521 is connected to the clasp mounting base 45, the clasp mounting base 45 is provided with a U-shaped clamp arm, a through hole is provided on the U-shaped clamp arm, the joint clasp 44 is inserted into the through hole, and the vehicle frame cannot be folded when the joint clasp is located in the locking groove 46, and can be folded when the joint clasp leaves the locking groove 46 and is located in the first arc-shaped groove 411 and the second arc-shaped groove 421.

In the embodiment of the present invention, the disassembly and assembly structure includes:

- an unlock button 31;

a locking hook 32, and the locking hook 32 is disposed on the unlock button;

a first locking hole 33, and the first locking hole 33 fits with the locking hook 32 for locking and unlocking purpose;

a plug 34, and the plug 34 is disposed on the first support base 23 and the second support base 24, and the first locking hole 33 is disposed on the plug 34;

a socket, and the socket is disposed on the front connecting base 12 and rear connecting base 13, and the front connecting base 12 and rear connecting base 13 are detachably connected to the first support base 23 and second support base 24 through plugs 13 and sockets 34.

The working principle of disassembly and assembly structure is explained as follows:

Press the unlock button 31 to unlock the locking hook 32 and the first locking hole 33, then lift the camping frame assembly 1 to remove it from the baby stroller, and align the plug 34 directly with the socket to complete installation when it is necessary to install the camping frame assembly 1 on the baby stroller.

In further, the baby stroller further includes a handle tube assembly, and the handle tube assembly includes:

an upper pipe section 81;

a lower pipe section 82, and the upper pipe section 81 can be flexibly disposed on the lower pipe section 82 to adjust the height of upper pipe section.

The camping frame assembly 1 further includes at least one seat structure 16, the seat structure 16 is mounted on the surrounding frame, and the seat structure 16 is provided with a seat portion 161 and a foot portion 162.

Two seat structures 16 are provided, and they are arranged in opposite directions, two seats can accommodate two children, and the two ceiling assemblies are disposed opposite to the two seats.

The working principles of vehicle retraction and folding of the present invention are explained as follows:

Retraction

After pressing the retraction button 51 and pulling the retraction button 52 upwards to drive the retraction steel rope 521 connected, the retraction steel rope 521 drives the clasp mounting base 45, and the clasp mounting base 45 drives the joint clasp 44 to push the joint clasp 44 out of the locking groove 46, so that the handle tube and front support foot 21 are unlocked, the handle tube and the front support foot 21 can be rotated and folded, and the handle tube is pressed down towards the position where the rear support feet 22 are close to each other, and the support assembly synchronously connects the camping frame assembly 1 and folds until it is fully folded together.

Unfolding

Lift the handle tube to move between the position where the handle tube and the rear support foot 22 are far away from each other, the support assembly synchronously connects and folds the camping frame assembly 1, the joint clasp 44 on the rear support foot 22 is returned to the locking groove 46 under the action of clasp reset spring (not illustrated), and then the handle tube and rear support foot 22 are locked and the unfolding operation is finished.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A baby stroller with functions of camper, including:

a camping frame assembly, and the camping frame assembly includes a surrounding frame, and the surrounding frame is provided with a front connecting base and a rear connecting base;

a support assembly, the support assembly includes a front support foot, a rear support foot, a first support base disposed on the front support foot, and a second support base disposed on the rear support foot, the front connecting base is detachably connected to the first support base, and the rear connecting base is detachably connected to the second support base;

a disassembly and assembly structure, through which the camping frame assembly can be detachably installed on the support assembly;

a folding assembly, and the folding assembly is connected to the support assembly; and a retraction assembly, and the retraction assembly is used to control the folding assembly to retract the camper.

2. The baby stroller with functions of camper according to claim 1, wherein the surrounding frame includes a first surrounding frame and a second surrounding frame, and the first surrounding frame and the second surrounding frame are directly or indirectly pivotably connected through a middleware.

3. The baby stroller with functions of camper according to claim 2, wherein the middleware is a surrounding frame joint, including a front surrounding frame joint and a rear surrounding frame joint, and the front surrounding frame joint and the rear surrounding frame joint can be pivotally connected.

4. The baby stroller with functions of camper according to claim 3, wherein the camping frame assembly further includes a storage tray, and the two ends of the storage tray are respectively connected to the surrounding frame joint.

5. The baby stroller with functions of camper according to claim 3, wherein the camping frame assembly further includes at least one ceiling assembly, the ceiling assembly includes a mounting base and a frame connecting the mounting base, the mounting base includes a connecting base and a pivot base, the free end of the frame is inserted into the connecting base, the connecting base is pivotally connected to the pivot base, and the pivot base is installed on the surrounding frame or surrounding frame joint.

6. The baby stroller with functions of camper according to claim 5, wherein two ceiling assemblies are provided, and they are disposed opposite each other.

7. The baby stroller with functions of camper according to claim 2, wherein the upper end of the front connecting base can be pivotally connected to the first surrounding frame, the lower end of the front connecting base can be pivotally connected to the first support base, the upper end of the rear connecting base can be pivotally connected to the first surrounding frame, and the lower end of the rear connecting base can be pivotally connected to the second support base.

8. The baby stroller with functions of camper according to claim 7, wherein the front connecting base includes a first upper section and a first lower section, the upper end of the first upper section can be pivotally connected to the first surrounding frame, the lower end of the first upper section can be pivotally connected to the upper end of the first lower section, and the lower end of the first lower section can be detachably connected to the upper end of the first support base.

9. The baby stroller with functions of camper according to claim 7, wherein the rear connecting base includes a second upper section and a second lower section, the upper end of the second upper section can be pivotally connected to the second surrounding frame, the lower end of the second upper section can be pivotally connected to the upper end of the second lower section, and the lower end of the second lower section can be detachably connected to the upper end of the second support base.

10. The baby stroller with functions of camper according to claim 1, wherein the folding assembly includes:

a handle tube joint;

a front support joint that is disposed on the front support foot, and the handle tube joint and front support joint are rotatably disposed with each other;

a rear support joint that is disposed on the rear support foot;

a joint clasp that is disposed at the rear support joint, the joint clasp is used to lock and release the handle tube joint from the front support joint.

11. The baby stroller with functions of camper according to claim 10, wherein the handle tube joint is provided with a first arc-shaped groove, the front support joint is provided with a second arc-shaped groove, and both the first and second arc-shaped grooves are provided with locking grooves.

12. The baby stroller with functions of camper according to claim 11, wherein the retraction assembly includes a retraction button, a linkage piece, a joint clasp, and a clasp mounting base, the linkage piece includes a retraction steel rope, the first end of the retraction steel rope is connected to the retraction button, and the second end of the retraction steel rope is connected to the clasp mounting base.

13. The baby stroller with functions of camper according to claim 1, wherein the disassembly and assembly structure includes:

an unlock button;

a locking hook, and the locking hook is disposed on the unlock button;

a first locking hole, and the first locking hole fits with the locking hook for locking and unlocking purpose;

a plug, and the plug is disposed on the first support base and the second support base, and the first locking hole is disposed on the plug;

a socket, and the socket is disposed on the front connecting base and rear connecting base, and the front connecting base and rear connecting base are detachably connected to the first support base and second support base through plugs and sockets.

14. The baby stroller with functions of camper according to claim 1, further including a handle tube assembly, and the handle tube assembly includes:

an upper pipe section;

a lower pipe section, and the upper pipe section can be flexibly disposed on the lower pipe section to adjust the height of upper pipe section.

15. The baby stroller with functions of camper according to claim 1, wherein the camping frame assembly further includes at least one seat structure, the seat structure is mounted on the surrounding frame, and the seat structure is provided with a seat portion and a foot portion.

16. The baby stroller with functions of camper according to claim 15, wherein two seat structures are provided, and they are arranged in opposite directions.

* * * * *